(12) United States Patent
Ito et al.

(10) Patent No.: US 6,876,153 B2
(45) Date of Patent: Apr. 5, 2005

(54) SWITCHING REGULATOR CIRCUIT AND VEHICULAR LAMP

(75) Inventors: Masayasu Ito, Shizuoka-ken (JP); Hitoshi Takeda, Shizuoka-ken (JP); Kentaro Murakami, Shizuoka-ken (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 10/684,756

(22) Filed: Oct. 14, 2003

(65) Prior Publication Data

US 2004/0075394 A1 Apr. 22, 2004

(30) Foreign Application Priority Data

Oct. 15, 2002 (JP) ...................................... 2002-300961

(51) Int. Cl.[7] .............................................. H05B 37/02
(52) U.S. Cl. ................... 315/82; 315/307; 315/DIG. 7; 363/16
(58) Field of Search ............................ 315/82, 83, 307, 315/DIG. 7; 363/16

(56) References Cited

U.S. PATENT DOCUMENTS 5,212,428 A * 5/1993 Sasaki et al. ............... 315/308
5,671,128 A * 9/1997 Nakamura et al. ........... 363/16

FOREIGN PATENT DOCUMENTS

JP          2001-215913          8/2001

* cited by examiner

*Primary Examiner*—David Vu
(74) *Attorney, Agent, or Firm*—Osha & May L.L.P.

(57) ABSTRACT

A switching regulator circuit for controlling power supplied to a load, includes: a switching device for repeatedly going on or off to control a voltage or a current applied to the load; a detector for detecting a supply voltage or a supply current supplied to the load; and a controller for controlling a duration ratio of a period in which the switching device is on or off based on the supply voltage or supply current detected by the detector, so as to control a value of the voltage applied to the load. The controller includes: a saw-tooth wave generation unit for charging and discharging a saw-tooth wave generation capacitor grounded at one end so as to change a voltage at another end of the saw-tooth wave generation capacitor to a saw-tooth wave; a charge/discharge controller for changing a ratio of a charge rate and a discharge rate of the saw-tooth wave generation capacitor based on the supply voltage or supply current detected by the detector; and a switching device controller for comparing a voltage value of the saw-tooth wave generation capacitor with a predetermined threshold value and controlling the duration ratio of the period in which the switching device is on or off based on the comparison result.

5 Claims, 6 Drawing Sheets

SWITCHING REGULATOR CIRCUIT AND VEHICULAR LAMP

This patent application claims priority from a Japanese patent application No. 2002-300961 filed on Oct. 15, 2002, the contents of which are incorporated herein by reference.

BACKGROUND OF THE INVENTION

1. Field of the Invention

The present invention relates to a switching regulator circuit that supplies power to be supplied to a load and a vehicular lamp used in a vehicle.

2. Description of the Related Art

Conventionally, a switching regulator circuit is provided between a power supply and a load, in order to control power to be supplied to the load as disclosed, for example, in Japanese Patent Application Laid-Open No. 2001-215913, pages 6–12 and FIGS. 2–6. The switching regulator circuit repeatedly switches whether or not the power is allowed to be supplied to the load, thereby controlling a duty ratio of a voltage and a current that are to be supplied to the load.

The switching regulator circuit generates a saw-tooth wave and switches whether or not the power is supplied to the load at a timing based on the result of comparison of a value of the thus generated saw-tooth wave with a predetermined threshold value. Moreover, the switching regulator circuit changes the threshold value with which the value of the saw-tooth wave is compared or changes the frequency of the saw-tooth wave and the threshold value with which the value of the saw-tooth wave is compared, thereby controlling the duty ratio of the voltage and current to be supplied to the load. The control of the frequency of the saw-tooth wave and the control of the threshold value are performed by using an integrated circuit.

According to the conventional method of controlling the duty ratio mentioned above, however, the integrated circuit for the control is required. This increases the cost of the switching regulator circuit. Especially, in a case of controlling a high voltage and a large current, an integrated circuit having the increased cost is required. Although a high-performance control circuit such as the integrated circuit is not required in a case where it is not necessary to perform the control with high precision, the conventional control method mentioned above requires the integrated circuit. However, the use of the integrated circuit did not provide effects that are worth the cost.

SUMMARY OF THE INVENTION

Therefore, it is an object of the present invention to provide a switching regulator circuit and a vehicular lamp, which are capable of overcoming the above drawbacks accompanying the conventional art. The above and other objects can be achieved by combinations described in the independent claims. The dependent claims define further advantageous and exemplary combinations of the present invention.

According to the first aspect of the present invention, a switching regulator circuit for controlling power supplied to a load, comprises: a switching device operable to repeatedly go on or off to control a voltage or a current applied to the load; a detector operable to detect a supply voltage or a supply current supplied to the load; and a controller operable to control a duration ratio of a period in which the switching device is on or off based on the supply voltage or the supply current detected by the detector, to control a value of the voltage applied to the load, wherein the controller includes: a saw-tooth wave generation unit operable to charge and discharge a saw-tooth wave generation capacitor grounded at one end to change a voltage at another end of the saw-tooth wave generation capacitor like a saw-tooth wave; a charge/discharge controller operable to change a ratio of a rate at which the saw-tooth wave generation capacitor is charged and a rate at which the saw-tooth wave generation capacitor is discharged, based on the supply voltage or the supply current detected by the detector; and a switching device controller operable to compare a voltage value of the saw-tooth wave generation capacitor with a predetermined threshold value and to control the duration ratio of the period in which the switching device is on or off based on the comparison result.

The charge/discharge controller may output a charge/discharge control voltage based on the supply voltage or the supply current detected by the detector, the switching device controller may be a comparator that compares a voltage of the saw-tooth wave generation capacitor with a comparison voltage supplied to the switching device controller and outputs a switching control voltage for controlling the switching device based on the comparison result, and the saw-tooth wave generation unit may include: the saw-tooth wave generation capacitor operable to be charged at a rate in accordance with the charge/discharge control voltage; a hysteresis generation unit operable to determine the comparison voltage to be supplied to the switching device controller in accordance with the switching control voltage; and a discharge diode operable to discharge the saw-tooth wave generation capacitor at an approximately constant rate, in a case where the voltage of the saw-tooth wave generation capacitor is higher than the switching control voltage.

The charge/discharge controller may output a charge/discharge control voltage based on the supply voltage or the supply current detected by the detector, the switching device controller may be a schmitt trigger inverter, to which a voltage of the saw-tooth wave generation capacitor is supplied, operable to output a switching control voltage for controlling the switching device based on the voltage of the saw-tooth wave generation capacitor, and the saw-tooth wave generation unit may include: the saw-tooth wave generation capacitor operable to be charged at a rate in accordance with the charge/discharge control voltage; and a discharge diode operable to discharge the saw-tooth wave generation capacitor at an approximately constant rate in a case where the voltage of the saw-tooth wave generation capacitor is higher than the switching control voltage.

The detector may include: a current detecting resistor, provided between an external voltage and the load, operable to allow the supply current to flow therethrough; a transistor having an emitter terminal electrically connected to one end of the current detecting resistor and a base terminal electrically connected to another end of the current detecting resistor, the transistor generating a collector current in accordance with voltage drop in the current detecting resistor to supply the collector current to the charge/discharge controller; and a temperature compensating diode, provided between the base terminal of the transistor and the other end of the current detecting resistor in series, operable to compensate change of a threshold voltage of the transistor caused by temperature change.

According to the second aspect of the present invention, a vehicular lamp used in a vehicular, comprises: a light source operable to emit light in accordance with power supplied thereto; a switching device operable to repeatedly go on or off to control a voltage or a current applied to the light source; a detector operable to detect a supply voltage or a supply current that is supplied to the light source; and a controller operable to control a duration ratio of a period in which the switching device is on or off based on the supply voltage or the supply current detected by the detector, to control a value of the voltage applied to the light source, wherein the controller includes: a saw-tooth wave generation unit operable to charge and discharge a saw-tooth wave generation capacitor to change a voltage of the saw-tooth wave generation capacitor like a saw-tooth wave; a charge/discharge controller operable to change a ratio of a rate at which the saw-tooth wave generation capacitor is charged and a rate at which the saw-tooth wave generation capacitor is discharged based on the supply voltage or the supply current detected by the detector; and a switching device controller operable to compare a value of the voltage of the saw-tooth wave generation capacitor with a predetermined threshold voltage and to control the duration ratio based on the comparison result.

The summary of the invention does not necessarily describe all necessary features of the present invention. The present invention may also be a sub-combination of the features described above. The above and other features and advantages of the present invention will become more apparent from the following description of the embodiments taken in conjunction with the accompanying drawings.

BRIEF DESCRIPTION OF THE DRAWINGS

FIG. 2A shows an exemplary structure of a charge/discharge controller 40, saw-tooth wave generation unit 50 and switching device controller 30 of the controller 20; and FIG. 2B shows an exemplary operation of the controller 20 and switching device controller 30.

DETAILED DESCRIPTION OF THE INVENTION

The invention will now be described based on the preferred embodiments, which do not intend to limit the scope of the present invention, but exemplify the invention. All of the features and the combinations thereof described in the embodiment are not necessarily essential to the invention.

Figure 1:
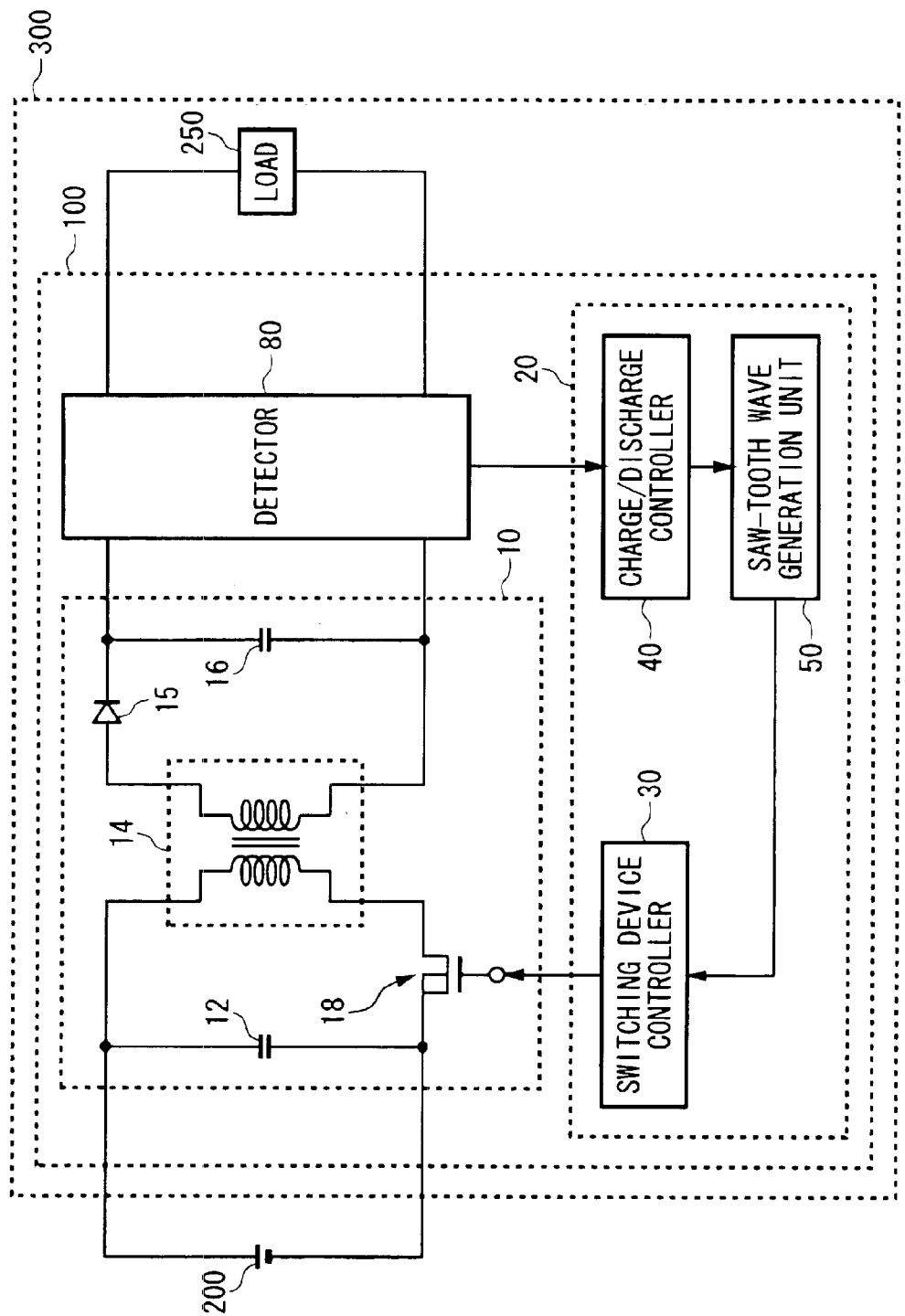
FIG. 1 shows an exemplary structure of a vehicular lamp 300 according to an embodiment of the present invention.

FIG. 1 shows an exemplary structure of a vehicular lamp 300 according to an embodiment of the present invention. The vehicular lamp 300 is used in a vehicle such as a car. The vehicular lamp 300 includes a switching regulator circuit 100 and a load 250.

The load 250 is a light source such as a light-emitting diode, and emits light in accordance with power supplied thereto. The switching regulator circuit 100 receives power from an external power supply 200 and supplies the received power to the load 250 after adjusting it. The power supply 200 is a battery mounted on the vehicle, for example.

The switching regulator circuit 100 includes a switching circuit 100, a controller 20 and a detector 80. The switching circuit 10 receives the power from the power supply 200 and supplies the received power to the load 250 after adjusting the received power. The switching circuit 10 includes a smoothening capacitor 12, a transformer 14, a switching device 18, a regulating device 15 and a smoothening capacitor 16.

The transformer 14 is provided to form a loop together with the power supply 200. The switching device 18 switches whether or not a current is supplied from the power supply 200 to a primary coil of the transformer 14, thereby generating a supply voltage and a supply current at a secondary coil of the transformer 14. The regulating device 15 regulates the supply current supplied from the secondary coil of the transformer 14 to the load 150. The smoothening capacitor 12 removes a noise in the voltage and current that are supplied to the primary coil of the transformer 14, while the smoothening capacitor 16 smoothens the supply voltage and the supply current that are supplied by the secondary coil of the transformer 14 to the load 250.

The detector 80 detects the supply voltage or the supply current that is supplied by the switching circuit 10 to the load 250. The controller 20 controls a duration ratio of a period in which the switching device 18 is on or off (duty ratio) based on the supply voltage or the supply current detected by the detector 80, so as to control the supply voltage or the supply current that is applied to the load 250. The controller 20 includes a charge/discharge controller 40, a saw-tooth wave generation unit 50 and a switching device controller 30.

The saw-tooth wave generation unit 50 generates a saw-tooth wave. In this example, the saw-tooth wave generation unit 50 includes a saw-tooth wave generation capacitor grounded at one end. The saw-tooth wave generation unit 50 changes a potential at the other end of the saw-tooth wave generation capacitor like a saw-tooth wave, so as to generate the saw-tooth wave.

The charge/discharge controller 40 changes a ratio of a rate at which the saw-tooth wave generation capacitor is charged and a rate at which the saw-tooth wave generation capacitor is discharged, based on the supply voltage or the supply current that was detected by the detector 20. The switching device controller 30 compares a voltage charged in the saw-tooth wave generation capacitor with a predetermined threshold value so as to control the duration ratio in which the switching device 18 is on or off based on the comparison result.

According to the switching regulator circuit 100 of this example, the duty ratio of the switching device 18 can be controlled by a simple circuit structure.

Figure 2A:
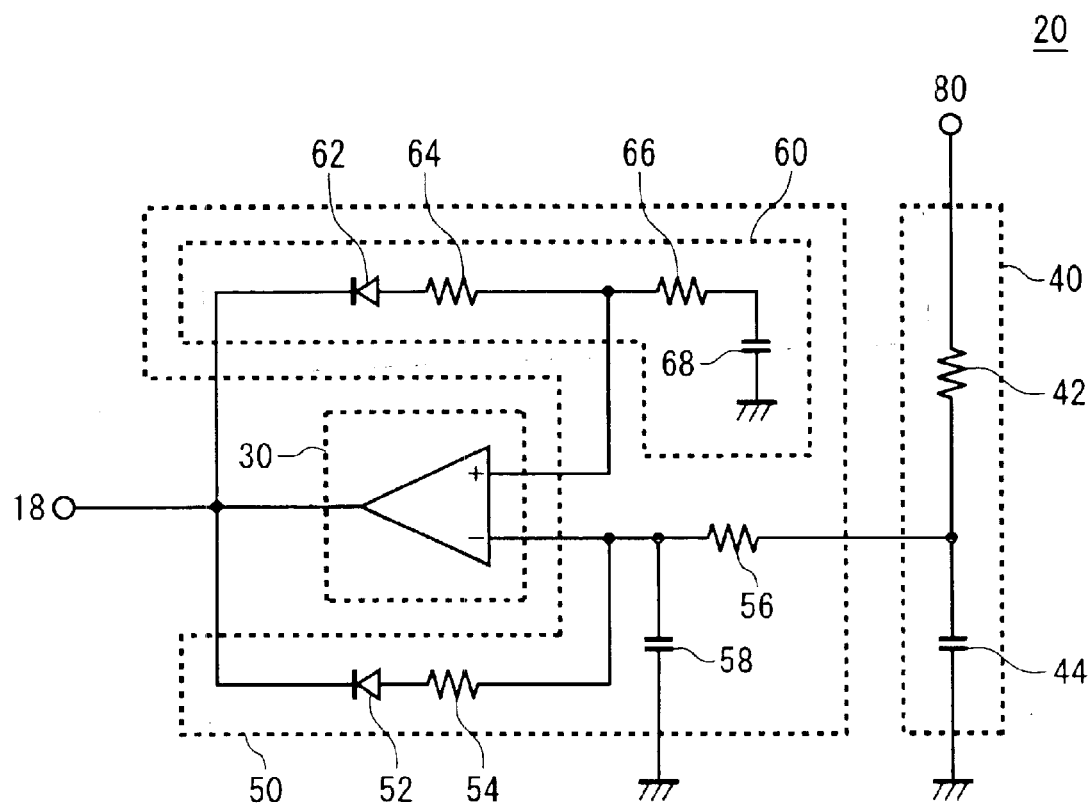
FIGS. 2A and 2B show a controller 20.
Figure 2B:
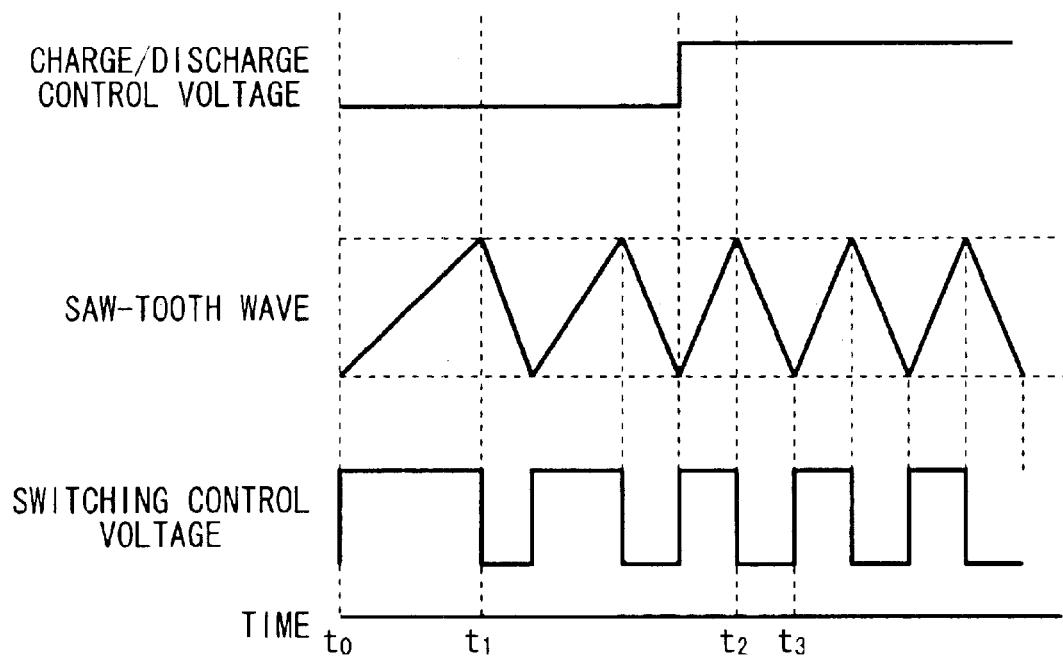

FIGS. 2A and 2B are used for explaining the controller 20. FIG. 2A shows an exemplary structure of the charge/discharge controller 40, saw-tooth wave generation unit 50 and switching device controller 30 of the controller 20. In this example, the switching device controller 30 is a comparator that compares a voltage of the saw-tooth wave generation capacitor 58 with a comparison voltage supplied to the switching device controller 30 and outputs a switching control voltage for controlling the switching device 18 based on the comparison result.

The charge/discharge controller 40 receives a voltage and a current in accordance with the supply voltage or the supply current from the detector 80 and then supplies a charge/discharge control voltage in accordance with the received voltage and current to the saw-tooth wave generation unit 50. The charge/discharge controller 40 includes a resistor 42 connected to the detector 80 at its one end and a capacitor 44 provided between the other end of the resistor 42 and ground potential, and supplies a potential difference between the ground potential and a potential at the other end of the resistor 42 to the saw-tooth wave generation unit 50 as the charge/discharge control voltage.

The saw-tooth wave generation unit 50 includes a charge resistor 56, a discharge resistor 54, a discharge diode 52, a saw-tooth wave generation capacitor 58 and a hysteresis generation unit 60. The charge resistor 56 has one end connected between the resistor 42 and the capacitor 44 and the other end connected to a negative input terminal of the switching device controller 30 and the saw-tooth wave generation capacitor 58. To the charge resistor 56, the charge/discharge control voltage is applied.

The saw-tooth wave generation capacitor 58 is connected to the ground potential at one end and is also connected to the negative input terminal of the switching device controller 30 and the resistor 42 at the other end. The saw-tooth wave generation capacitor 58 is charged at a rate in accordance with the charge/discharge control voltage applied to the charge resistor 56.

The discharge resistor 54 is electrically connected to the other end of the charge resistor 56 at its one end so as to be provided in parallel to the saw-tooth wave generation capacitor 58. The other end of the discharge resistor 54 is connected to an output terminal of the switching device controller 30 via the discharge diode 52. The discharge resistor 54 defines the discharge rate of the saw-tooth wave generation capacitor 58.

The discharge diode 52 is connected to the discharge resistor 54 at its anode and is connected to the output terminal of the switching device controller 30 at its cathode. In a case where the voltage charged in the saw-tooth wave generation capacitor 58 is higher than the comparison voltage that changes in accordance with a switching control voltage output from the switching device controller 30, the switching device controller 30 outputs the switching control voltage of L level. In this case, the discharge diode 52 discharges the saw-tooth wave generation capacitor 58 at an approximately constant discharge rate. On the other hand, in a case where the charged voltage in the saw-tooth wave generation capacitor 58 is lower than the comparison voltage that changes in accordance with the switching control voltage output from the switching device controller 30, the switching device controller 30 outputs the switching control voltage of H level and the saw-tooth wave generation capacitor 58 is charged in accordance with the charge/discharge control voltage. In this manner, it is possible to supply the saw-tooth wave to the negative input terminal of the switching device controller 30.

The hysteresis generation unit 60 determines the comparison voltage to be supplied to the switching device controller 30, in accordance with the switching control voltage. The hysteresis generation unit 60 includes a comparison-voltage supply 68, the first comparison-voltage generation resistor 66, the second comparison-voltage generation resistor 64 and a comparison-voltage generation diode 62.

The comparison-voltage supply 68 is a reference voltage supply for generating the comparison voltage. The first comparison-voltage generation resistor 66 is provided between the comparison-voltage supply 68 and a positive input terminal of the switching device controller 30 in series. The second comparison-voltage generation resistor 64 is connected at one end between the first comparison-voltage generation resistor 66 and the positive input terminal of the switching device controller 30 and is connected at the other end to an output terminal of the switching device controller 30 via the comparison-voltage generation diode 62.

The comparison-voltage generation diode 62 is connected at its anode to the second comparison-voltage generation resistor 64 and is connected at its cathode to the output terminal of the switching device controller 30. That is, in a case where the switching control voltage is at H level, a voltage generated by the comparison-voltage supply 68 is supplied as the comparison voltage to the positive input terminal of the switching device controller 30. In a case where the switching control voltage is at L level, a voltage obtained by dividing the voltage generated by the comparison-voltage supply 68 by the first and second comparison voltage generation resistors 66 and 64, is supplied to the positive input terminal of the switching device controller 30 as the comparison voltage.

FIG. 2B explains operations of the controller 20 and the switching device controller 30. At time $t_0$, the charge/discharge controller 40 supplies the charge/discharge control voltage to the saw-tooth wave generation unit 50. The saw-tooth wave generation capacitor 58 is then charged in accordance with the charge/discharge control voltage and therefore the voltage of the saw-tooth wave that is supplied to the negative input terminal of the switching device controller 30 increases. In this case, the voltage generated by the comparison-voltage supply 68 is supplied as the comparison voltage to the switching device controller 30 which then outputs a voltage of H level that turns the switching device 18 on.

When the charged voltage in the saw-tooth wave generation capacitor 58 has exceeded the voltage generated by the comparison-voltage supply 68, the switching device controller 30 outputs a voltage of L level as the switching control voltage (at time $t_1$). In a case where the switching control voltage became L level, the electric charges stored in the saw-tooth wave generation capacitor 58 are discharged via the discharge resistor 54 and discharge diode 52 at a rate defined by the discharge resistor 54. In this case, the voltage divided in the aforementioned manner is supplied as the comparison voltage to the switching device controller 30, which outputs a voltage of L level that turns the switching device 18 off.

Then, the saw-tooth wave generation capacitor 58 is discharged until the charged voltage of the saw-tooth wave generation capacitor 58 becomes lower than the comparison voltage obtained by division of the voltage mentioned above. When the charged voltage of the saw-tooth wave generation capacitor 58 became lower than the comparison voltage obtained by the division of voltage, the saw-tooth wave generation capacitor 58 is charged again by the charge/discharge control voltage.

Next, in a case where the charge/discharge control voltage increased, the charge rate at which the saw-tooth wave generation capacitor 58 is charged also increases (at time $t_2$) As shown in FIG. 2B, a period required for charging the saw-tooth wave generation capacitor 58 in a case where the higher charge/discharge control voltage is supplied to the saw-tooth wave generation unit 50, $(t_3-t_2)$, is shorter than that in a case where the lower charge/discharge control voltage is supplied, $(t_1-t_0)$. Since the discharge rate is constant irrespective of the charge/discharge control voltage, the duty ratio of the switching control voltage is changed by the charge/discharge control voltage. In other words, in a case where supply power that is supplied to the load 250 is larger, the duty ratio of the switching device 18 can be reduced. In another case where the supply power is smaller, the duty ratio of the switching device 18 can be increased.

According to the switching regulator circuit 100 of this example, it is possible to supply the supply power that is approximately constant to the load 250 by a simple circuit structure. Also, in the vehicular lamp 300, it is possible to emit light with approximately constant light amount. Moreover, it is necessary to prevent excess power consumption in the vehicular lamp 300 because the power is supplied to the vehicular lamp 300 from the power supply 200 having the limited capacity, such as a battery. However, according to the switching regulator circuit 100 of this example, it is possible to prevent the oversupply of power to the load 250 by a simple circuit structure, so as to reduce the excess power. In addition, since the supply of excess power to the load 250 can be prevented, the load 250 can be protected. Furthermore, it is possible to control the switching device 18 by a simple circuit structure, thus increasing the reliability of the switching device 18 against breakdown and the like.

Figure 3:
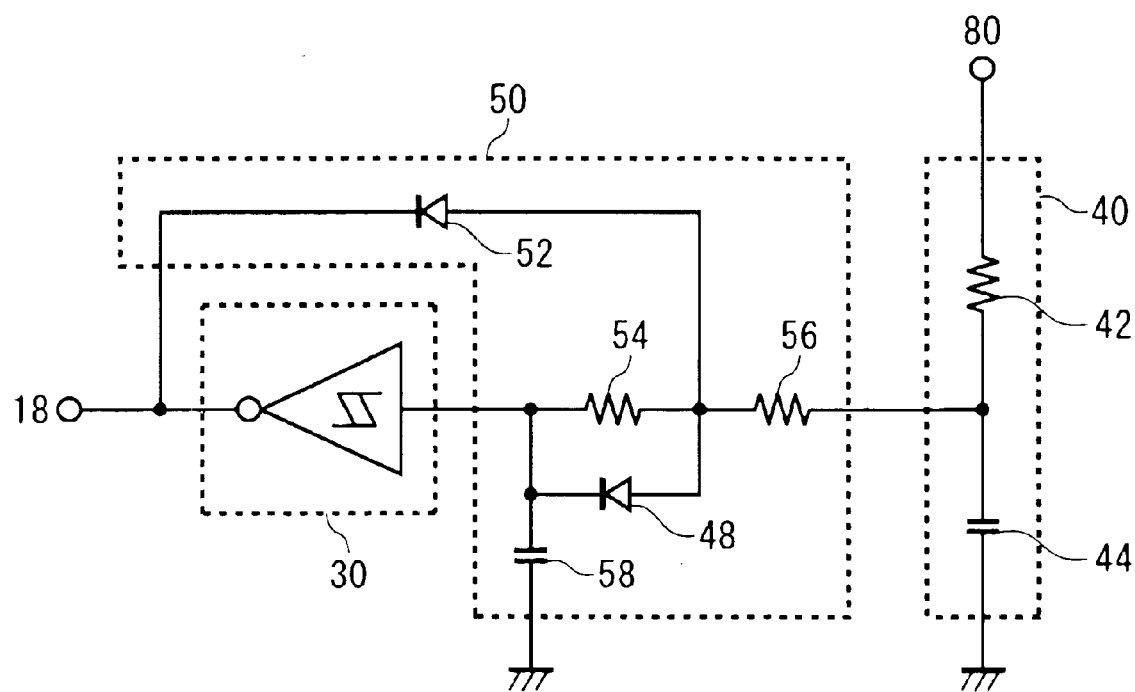
FIG. 3 shows another exemplary structure of the controller 20.

FIG. 3 shows another exemplary structure of the controller 20. The components in this example labeled with the same reference numerals as those in FIG. 2A have the same or similar functions and structures as/to those of the components described referring to FIG. 2A. The controller 20 includes the charge/discharge controller 40, the saw-tooth wave generation unit 50 and the switching device controller 30. The switching device controller 30 receives the voltage of the saw-tooth wave generation capacitor 58 supplied thereto and outputs the switching control voltage for controlling the switching device 18 based on the result of comparison of the voltage of the saw-tooth wave generation capacitor 58 with a predetermined threshold value. In this example, the switching device controller 30 is a schmitt trigger inverter in which the threshold value changes in accordance with the switching control voltage.

The charge/discharge controller 40 has the same function and structure as those of the charge/discharge controller 40 shown in FIG. 2A. The saw-tooth wave generation unit 50 includes the saw-tooth wave generation capacitor 58, a charge diode 48, the charge resistor 56, the discharge resistor 54 and the discharge diode 52. The saw-tooth wave generation capacitor 58 is connected to ground potential at one end and is connected to the input terminal of the switching device controller 30 at the other end, and is charged at a rate in accordance with the charge/discharge control voltage.

The charge resistor 56 is connected between the resistor 42 and the capacitor 44 at one end and is also connected to the input terminal of the switching device controller 30 via the discharge resistor 54 at the other end. To the charge resistor 56, the charge/discharge control voltage is applied. One end of the discharge resistor 54 is connected to the other end of the saw-tooth wave generation capacitor 58 and the input terminal of the switching device controller 30, while the other end of the discharge resistor 54 is connected to the charge resistor 56. The charge diode 48 is provided between the charge resistor 56 and the saw-tooth wave generation capacitor 58 to be in parallel to the discharge resistor 54 in such a manner that the charge diode 48 allows a forward-direction current to flow from the charge resistor 56 to the saw-tooth wave generation capacitor 58. The discharge diode 52 is provided so as to allow a forward-direction current to flow from a point of connection of the charge resistor 56 and the discharge resistor 54 to the output terminal of the switching device controller 30.

The operation of the controller 20 in this example is similar to that of the controller 20 described referring to FIG. 2B. In a case where the charged voltage in the saw-tooth wave generation capacitor 58 is lower than a threshold voltage of the schmitt trigger inverter, the saw-tooth wave generation capacitor 58 is charged by the charge/discharge control voltage via the charge resistor 56 and the charge diode 48. In a case where the charged voltage in the saw-tooth wave generation capacitor 58 is higher than the threshold voltage of the schmitt trigger inverter, the saw-tooth wave generation capacitor 58 is discharged via the discharge resistor 54 and the discharge diode 52.

Also in the switching regulator circuit 100 including the controller 20 of this example and the vehicular lamp 300 including such a switching regulator circuit, it is possible to achieve the same effects as those obtained by the switching regulator circuit 100 and the vehicular lamp 300 described referring to FIGS. 2A and 2B. Moreover, the switching device controller 30 is formed by a schmitt trigger inverter. Therefore, it is not necessary to include the hysteresis generation unit 60 in the controller 20, thus achieving the aforementioned effects by the further simpler circuit structure.

Figure 4A:
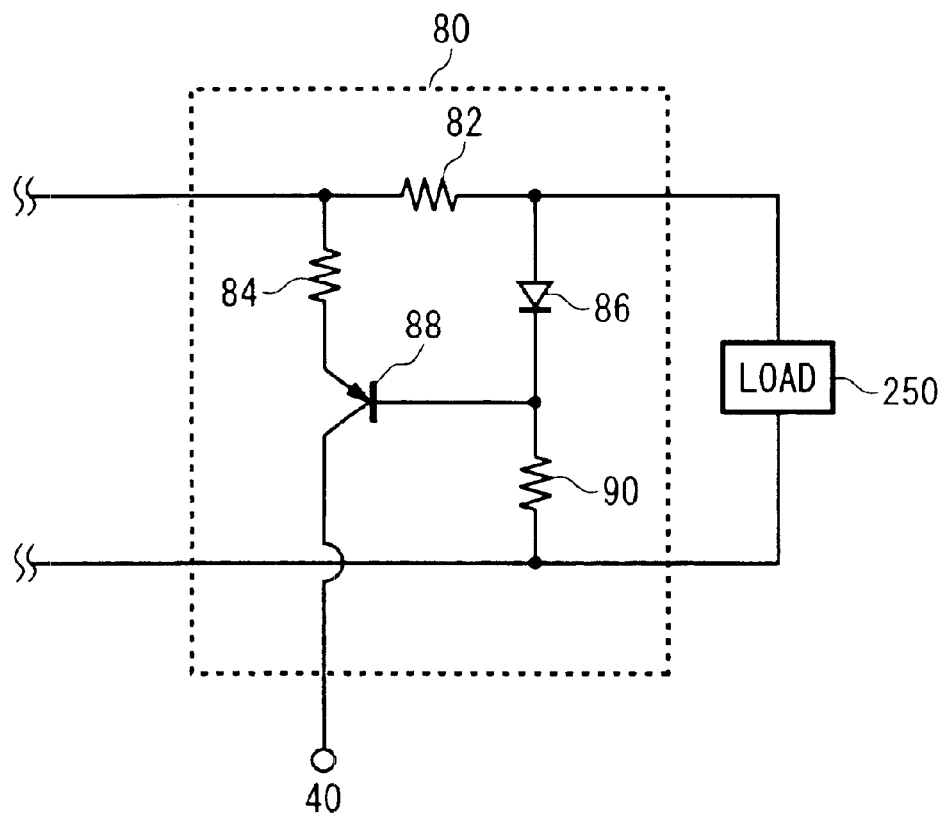
FIG. 4A shows an exemplary structure of a detector 80.
Figure 4B:
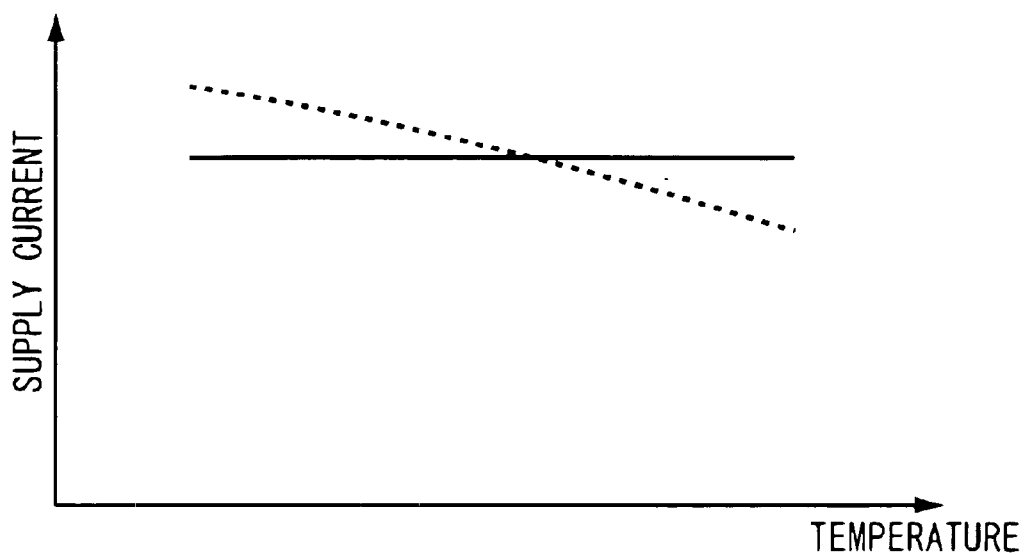
FIG. 4B shows an exemplary relationship between ambient temperature and a supply current.

FIGS. 4A and 4B show the detector 80. FIG. 4A shows an exemplary structure of the detector 80. The detector 80 is provided between the external power supply 200 and the load 250 and includes a current detecting resistor 82, a transistor 88, an emitter resistor 84, a temperature compensating diode 86 and a resistor 90.

The current detecting resistor 82 is provided between the power supply 200 and the load 250. Through the current detecting resistor 82, the supply current is supplied to the load 250. In this example, the current detecting resistor 82 receives the supply current from the high-voltage side of the switching circuit 10 and supplies the received supply current to the load 250.

The emitter resistor 84 is connected between the current detecting resistor 82 and the switching circuit 10 at one end and is connected to an emitter terminal of the transistor 88 at the other end. The transistor 88 is electrically connected to one end of the current detecting resistor 82 at its emitter terminal and is electrically connected to the other end of the current detecting resistor 82 via the temperature compensating diode 86 at its base terminal. The transistor 88 generates a collector current in accordance with voltage drop in the current detecting resistor 82 and supplies the collector current to the charge/discharge controller 40.

The temperature compensating diode 86 is provided between the base terminal of the transistor 88 and the other end of the current detecting resistor 82 in series and compensates change of a threshold voltage of the transistor 88 caused by the temperature change. The temperature compensating diode 86 is provided so as to allow a forward-direction current to flow from the current detecting resistor 82 to the base terminal of the transistor 88. The resistor 90 electrically connects the base terminal of the transistor 88 to the low-voltage side of the switching circuit 10.

In a case where the supply current has increased and the voltage drop in the current detecting resistor 82 has become larger than the threshold voltage between the emitter and the base of the transistor 88, the collector current flows in the transistor 88. Thus, the charge/discharge control voltage output from the charge/discharge controller 40 becomes larger, thereby decreasing the duty ratio of the switching device 18.

The threshold voltage of the transistor 88 is changed by ambient temperature so as to cause the change of the collector current. However, the change of the collector current by that temperature change can be reduced by providing the temperature compensating diode 86. In other words, the change of the threshold voltage of the transistor 88 can be compensated by change of a forward-direction voltage of the temperature compensating diode 86 caused by the above-described temperature change.

FIG. 4B shows an exemplary relationship between ambient temperature and the supply current. In FIG. 4B, solid line represents a case where the temperature compensating diode 86 is included, while broken line represents a case where no temperature compensating diode 86 is included. The threshold voltage of the transistor 88 becomes lower as the ambient temperature becomes higher. Thus, the collector current increases and the duty ratio of the switching device 18 becomes smaller. Therefore, the supply current that is supplied to the load 250 is reduced. According to the detector 80 of this example, the forward-direction voltage of the temperature compensating diode 86 changes in accordance with the change of the ambient temperature. Therefore, it is possible to compensate the change of the threshold voltage of the transistor 88 so as to keep the supply current approximately constant.

Moreover, it is possible to reduce the resistance value of the current detecting resistor 82 by providing the temperature compensating diode 86. More specifically, to the gate terminal of the transistor 88, a voltage is applied in accordance with the sum of the voltage drop in the current detecting resistor 82 and the forward-direction voltage of the temperature compensating diode 86. Thus, the voltage drop in the current detecting resistor 82 that is required for turning the transistor 88 on can be made smaller. In this manner, the power consumed by the vehicular lamp 300 and the switching regulator circuit 100 can be reduced.

Figure 5:
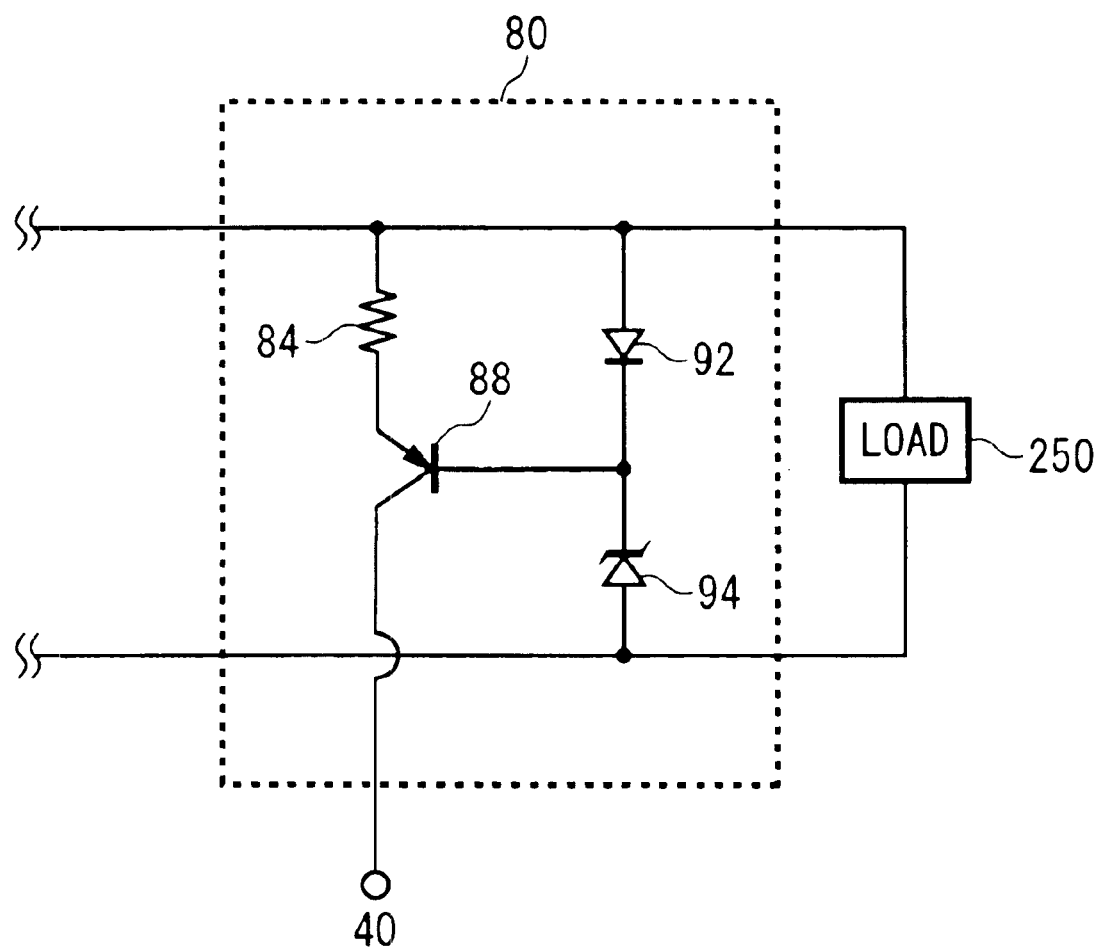
FIG. 5 shows another exemplary structure of the detector 80.

FIG. 5 shows another exemplary structure of the detector 80. In this example, the detector 80 includes a transistor 88, an emitter resistor 84, a base resistor 92 and a Zener diode 94.

The emitter resistor 84 is connected between the high-voltage side of the switching circuit 10 and the load 250 at one end and is connected to an emitter terminal of the transistor 88 at the other end. The base resistor 92 is connected between the high-voltage side of the switching circuit 10 and the load 250 at one end and is connected to a base terminal of the transistor 88 at the other end. Moreover, the Zener diode 94 is connected to the other end of the base resistor 92 and the base terminal of the transistor 88 at its cathode while being connected to the low-voltage side of the switching circuit 10 at its anode.

In a case where the supply voltage supplied to the load 250 became higher than a reverse-direction voltage of the Zener diode 94, a current flows through the base resistor 92 and the transistor 88 is turned on, thus a collector current in accordance with the supply voltage is generated. In the detector 80 of this example, by change of the reverse-direction threshold voltage of the Zener diode 94 caused by the change of the ambient temperature, it is possible to compensate the change of the threshold voltage of the transistor 88.

Figure 6A:
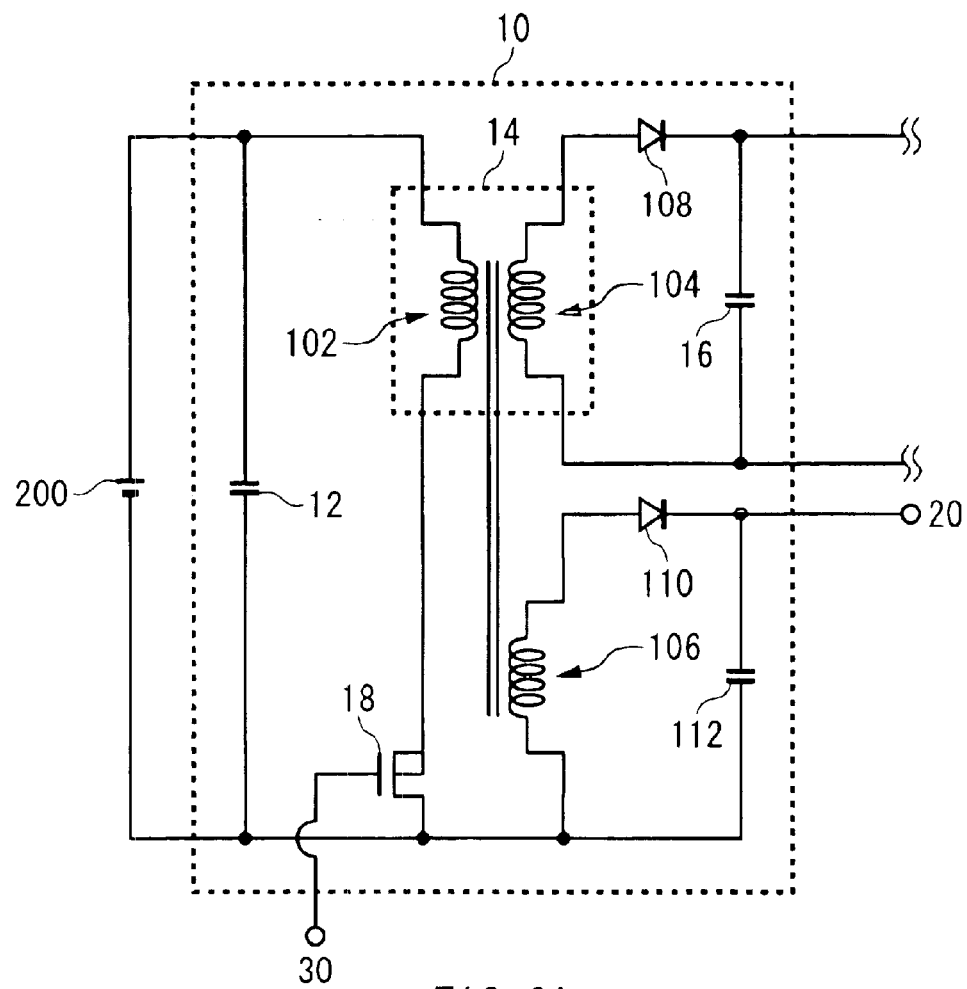
FIGS. 6A and 6B show examples of a structure of a switching circuit 10.
Figure 6B:
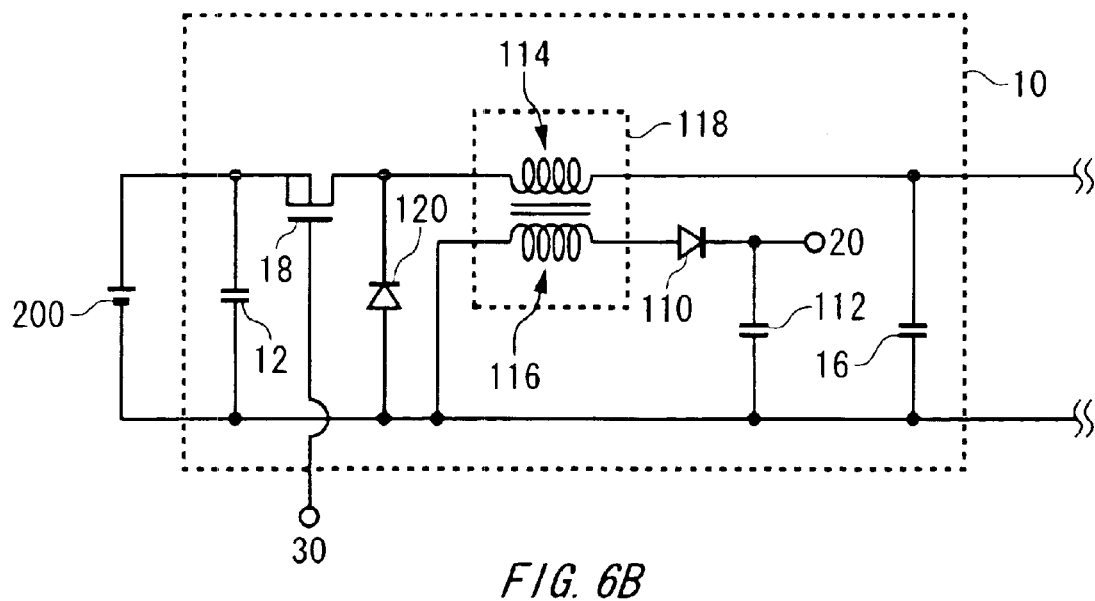

FIGS. 6A and 6B show exemplary structures of the switching circuit 10, respectively. In the example shown in FIG. 6A, the switching circuit 10 includes the structure of the switching circuit 10 described referring to FIG. 1 and further includes a control-power-supply coil 106, a diode 110, a smoothening capacitor 112 and a diode 108. The transformer 14 includes a primary coil 102 and a secondary coil 104.

The control-power-supply coil 106 is provided to form a transformer together with the primary coil 102. The control-power-supply coil 106 generates control power in accordance with the power supplied to the primary coil 102 and supplies the control power to the controller 20. The smoothening capacitor 112 is provided to form a loop together with the control-power-supply coil 106 and smoothens the control power to be supplied to the controller 20. The diode 108 is provided in series with the secondary coil 104 so as to prevent a reverse current. The diode 110 is provided in series with the control-power-supply coil 106 so as to prevent a reverse current.

According to the switching circuit 10 of this example, the power to be supplied to the controller 20 that controls the switching device 18 can be generated by a simple circuit structure.

FIG. 6B shows another exemplary structure of the switching circuit 10. In this example, the switching circuit 10 includes a smoothening capacitor 12, a switching device 18, a diode 120, a step-down coil 114, a control-power-source coil 116, a diode 110, a smoothening capacitor 112 and a smoothening capacitor 16.

The smoothening capacitors 12, 16 and 112 and the diode 110 have the same functions as those of the smoothening capacitor 12 and the diode 110 in the switching circuit 10 shown in FIG. 6A.

The step-down coil 114 is provided between a high-voltage terminal of the power supply 200 and a low-voltage terminal of the load 250 in series and supplies the supply voltage obtained by decreasing the power-supply voltage of the power supply 200 to the load 250. The switching device 18 is provided between the power supply 200 and the step-down coil 114, and makes the step-down coil 114 generate the supply voltage by repeatedly switching whether or not a current is supplied from the power supply 200 to the step-down coil 114. The diode 120 regulates the supply current.

The control-power-supply coil 116 is provided to form a transformer 118 together with the step-down coil 114 so as to generate the control power in accordance with the power supplied to the step-down coil 114. The generated control power is supplied to the controller 20. Also in the switching circuit 10 of this example, the power to be supplied to the controller 20 for controlling the switching device 18 can be generated by a simple circuit structure.

As is apparent from the above, according to the present invention, it is possible to control a switching device in a switching regulator circuit by a simple circuit structure.

Although the present invention has been described by way of exemplary embodiments, it should be understood that those skilled in the art might make many changes and substitutions without departing from the spirit and the scope of the present invention which is defined only by the appended claims.

What is claimed is:

1. A switching regulator circuit for controlling power supplied to a load, comprising:
    a switching device operable to repeatedly go on or off to control a voltage or a current applied to said load;
    a detector operable to detect a supply voltage or a supply current supplied to said load; and
    a controller operable to control a duration ratio of a period in which said switching device is on or off based on said supply voltage or said supply current detected by said detector, to control a value of said voltage applied to said load, wherein said controller includes:

a saw-tooth wave generation unit operable to charge and discharge a saw-tooth wave generation capacitor grounded at one end to change a voltage at another end of said saw-tooth wave generation capacitor to a saw-tooth wave;

a charge/discharge controller operable to change a ratio of a rate at which said saw-tooth wave generation capacitor is charged and a rate at which said saw-tooth wave generation capacitor is discharged, based on said supply voltage or said supply current detected by said detector; and a switching device controller operable to compare a voltage value of said saw-tooth wave generation capacitor with a predetermined threshold value and to control said duration ratio of said period in which said switching device is on or off based on the comparison result.

2. A switching regulator circuit as claimed in claim 1, wherein said charge/discharge controller outputs a charge/discharge control voltage based on said supply voltage or said supply current detected by said detector, said switching device controller is a comparator that compares a voltage of said saw-tooth wave generation capacitor with a comparison voltage supplied to said switching device controller and outputs a switching control voltage for controlling said switching device based on the comparison result, and said saw-tooth wave generation unit includes:

said saw-tooth wave generation capacitor operable to be charged at a rate in accordance with said charge/discharge control voltage;

a hysteresis generation unit operable to determine said comparison voltage to be supplied to said switching device controller in accordance with said switching control voltage; and a discharge diode operable to discharge said saw-tooth wave generation capacitor at an approximately constant rate, in a case where said voltage of said saw-tooth wave generation capacitor is higher than said switching control voltage.

3. A switching regulator circuit as claimed in claim 1, wherein said charge/discharge controller outputs a charge/discharge control voltage based on said supply voltage or said supply current detected by said detector, said switching device controller is a schmitt trigger inverter, to which a voltage of said saw-tooth wave generation capacitor is supplied, operable to output a switching control voltage for controlling said switching device based on said voltage of said saw-tooth wave generation capacitor, and said saw-tooth wave generation unit includes:

said saw-tooth wave generation capacitor operable to be charged at a rate in accordance with said charge/discharge control voltage; and a discharge diode operable to discharge said saw-tooth wave generation capacitor at an approximately constant rate in a case where said voltage of said saw-tooth wave generation capacitor is higher than said switching control voltage.

4. A switching regulator circuit as claimed in claim 2, wherein said detector includes:

a current detecting resistor, provided between an external voltage and said load, operable to allow said supply current to flow therethrough;

a transistor having an emitter terminal electrically connected to one end of said current detecting resistor and a base terminal electrically connected to another end of said current detecting resistor, said transistor generating a collector current in accordance with voltage drop in said current detecting resistor to supply said collector current to said charge/discharge controller; and a temperature compensating diode, provided between said base terminal of said transistor and said another end of said current detecting resistor in series, operable to compensate change of a threshold voltage of said transistor caused by temperature change.

5. A vehicular lamp used in a vehicular, comprising:

a light source operable to emit light in accordance with power supplied thereto;

a switching device operable to repeatedly go on or off to control a voltage or a current applied to said light source;

a detector operable to detect a supply voltage or a supply current that is supplied to said light source; and a controller operable to control a duration ratio of a period in which said switching device is on or off based on said supply voltage or said supply current detected by said detector, to control a value of said voltage applied to said light source, wherein said controller includes:

a saw-tooth wave generation unit operable to charge and discharge a saw-tooth wave generation capacitor to change a voltage of said saw-tooth wave generation capacitor to a saw-tooth wave;

a charge/discharge controller operable to change a ratio of a rate at which said saw-tooth wave generation capacitor is charged and a rate at which said saw-tooth wave generation capacitor is discharged based on said supply voltage or said supply current detected by said detector; and a switching device controller operable to compare a value of said voltage of said saw-tooth wave generation capacitor with a predetermined threshold voltage and to control said duration ratio based on the comparison result.

* * * * *